INVENTORS
JACK F. ALEXANDER
WALTER E. HANE
BY Bernard Olcott
ATTORNEY

INVENTORS
JACK F. ALEXANDER
WALTER E. HANE
BY Bernard Olcott
ATTORNEY

INVENTORS
JACK F. ALEXANDER
WALTER E. HANE
BY Bernard Olcott
ATTORNEY

FREQUENCY ENCODED DATA RECEIVER EMPLOYING PHASE-LOCK LOOP

Filed Feb. 14, 1964

INVENTORS
JACK F. ALEXANDER
WALTER E. HANE
BY Bernard Olcott
ATTORNEY

United States Patent Office 3,440,540

Patented Apr. 22, 1969

3,440,540
FREQUENCY ENCODED DATA RECEIVER EMPLOYING PHASE-LOCK LOOP

Walter E. Hane and Jack F. Alexander, Sanford, Fla., assignors to Ortronix, Inc., Orlando, Fla., a corporation of Florida Filed Feb. 14, 1964, Ser. No. 344,856
Int. Cl. H04b *1/16, 1/00, 7/00*
U.S. Cl. 325—320 5 Claims

ABSTRACT OF THE DISCLOSURE

This invention discloses a tone burst analyzer which is connectable to the output of a data receiver and comprises a Schmitt trigger circuit connected at its input side to receive an intermittent incoming signal from the data receiver which has its frequency encoded with intelligence. The analyzer is connected at its output side to drive a phase lock loop. A data generator is connected at its input side to the output of the phase lock loop through a 90° phase shifter and also to the output of the Schmitt trigger circuit. The output of the data generator is connected to drive another Schmitt trigger circuit through a filter. A data signal representative of the intelligence at the output of the data receiver appears on the output terminals of the last mentioned Schmitt trigger.

This invention relates to signal detectors and in particular to an improved tone burst analyzer for detecting, translating and decoding encoded intelligence which is greatly obliterated with noise.

When data transmission is attempted from remote satellites, the sending system requires lightweight, simple and dependable apparatus and the ground receiving system requires reliable equipment which can process weak, highly deteriorated data signals. It has been found that a tone burst telemetry system is particularly advantageous from the aspect of the satellite-borne telemetry equipment. At the receiving ground station, various detecting analyzing and decoding systems, including passive filters, have been employed to translate the data intelligence encoded in the audio frequency rate of the tone bursts. However, such receiving systems have severe limitations since the incoming low power level encoded signals are greatly obliterated by noise as a result of the tremendous distance separation between the sending and receiving stations.

This invention is addressed to the problem of coping with weak tone burst signals encoded with intelligence in the presence of large amounts of noise and other tone bursts at closely adjacent frequencies.

It is an object of this invention to improve ground station receiving equipment which in the prior art has employed a plurality of passive filters (capacitors, inductors and crystals), each being resonantly responsive to a discrete tone frequency, so that satellite intelligence can be received with more reliability from greater distances or with less transmitted signal power.

Another object of this invention is to provide an improved tone burst analyzer which can reliably process encoded data received as weak signals obliterated with a relatively large amount of noise.

Still another object of the invention is to provide improved tone burst analyzers for detecting one or more selected tone bursts operating within limited bands so that telemetry data may be frequency multiplexed on closely spaced bands to allow maximum binary data transmission with minimum overall bandwith in high ambient noise environments.

Also, another object of the invention is to provide an improved frequency spectrum analyzer.

Further, another object of the invention is to provide an improved teletype system employing frequency shift keying.

According to the invention there is provided a tone burst analyzer which comprises a phase lock loop adapted to receive a tone burst signal having a selected frequency for a selected time interval and including an oscillator; a phase shifter coupled at its input side to said oscillator at its output side; and a data generator means coupled at its input side to both the input side of said phase lock loop and the output side of said phase shifter for yielding one signal during the time periods when the instantaneous signal inputs to the data generator are similar and another signal when the instantaneous signal inputs to the data generator are dissimilar.

Other objects and features of the present invention will be set forth or apparent in the following description and claims and illustrated in the accompanying drawings, which disclose by way of example, and not by way of limitation, in a limited number of embodiments, the principle of the invention and structural implementations of the inventive concept.

In the drawings, in which like reference numbers designate like components in the several views.

Figure 1:
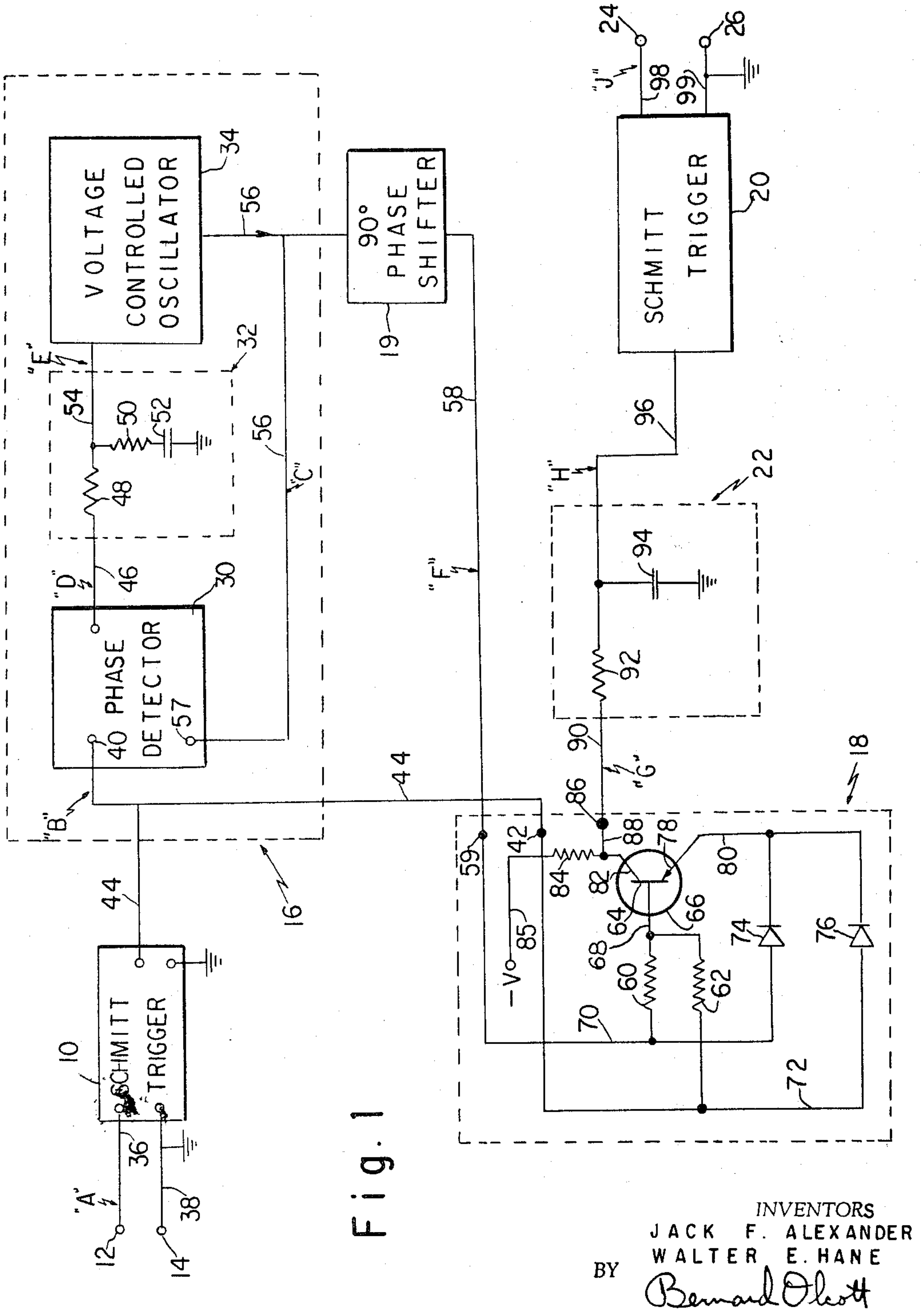
FIGURE 1 is a schematic diagram of a tone burst analyzer according to the invention.
Figure 2:
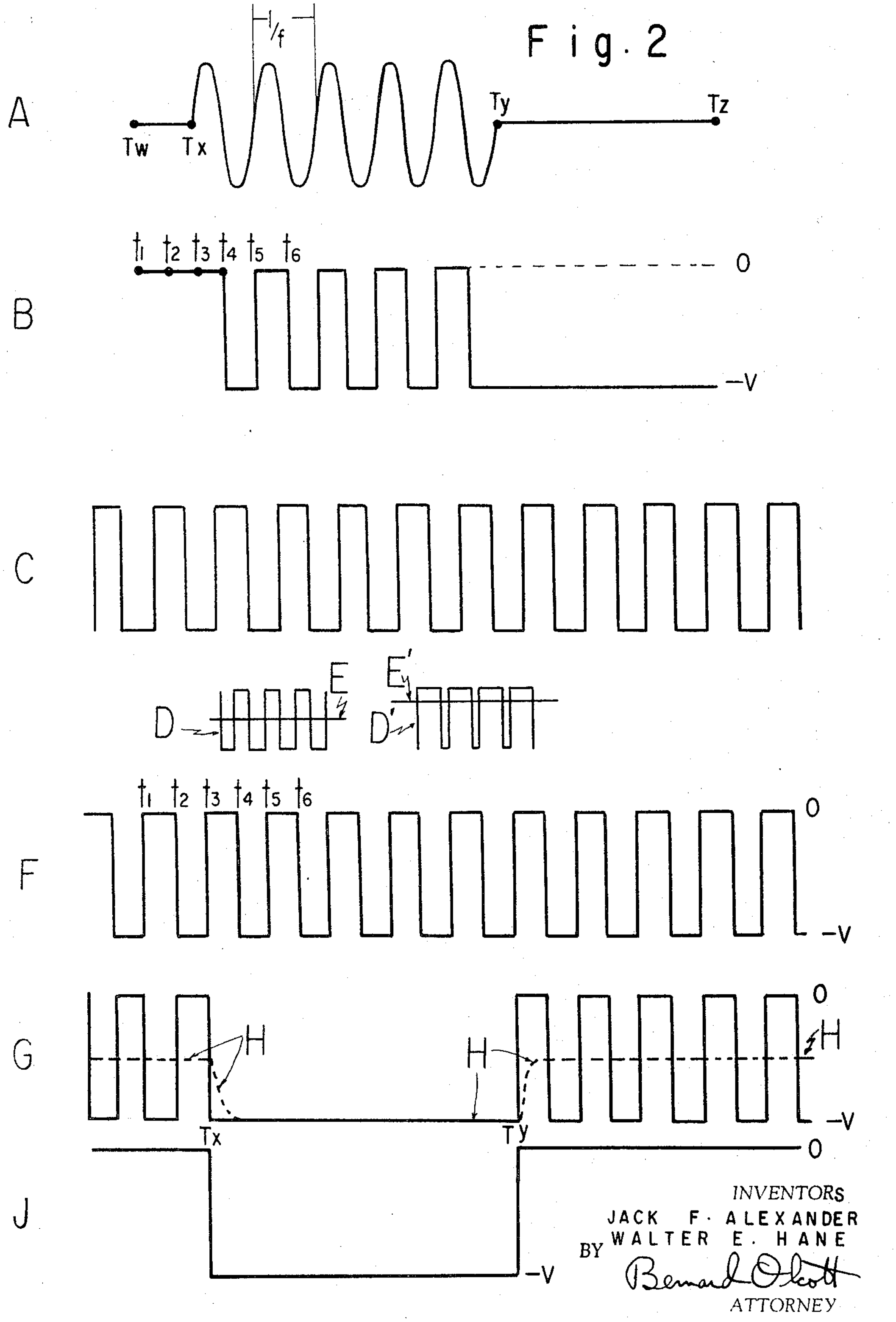
FIGURE 2 illustrates the waveforms of the signals in selected portions of FIGURE 1.

Referring to FIGS. 1 and 2, a tone burst analyzer comprises a Schmitt trigger circuit 10 connected at its input side to receive an intermittent incoming signal A frequency encoded with intelligence on terminals 12, 14 and connected at its output side to drive a phase lock loop 16. A data generaotr 18 is connected at its input side to the output of the phase lock loop 16 through a 90° phase shifter 19 and to the output of the Schmitt trigger circuit 10. The output of the data generator 18 is connected to drive another Schmitt trigger circuit 20 through a filter 22. A data signal representative of the intelligence in the tone burst A appears on the output terminals 24, 26 of the Schmitt trigger 20.

The phase lock loop 16, such as described in the article, "Phase-Locked Oscillator," Harold T. McAleer, Proceedings of the IRE, June 1959, vol. 47, No. 6, pages 1137 to 1143, comprises a phase detector 30, filter 32 and voltage controlled oscillator 34. Being in the published art, the schematic circuits for the components of the phase lock loop will not be detailed nor will the theory of the operation of the phase lock loop be described. The same can be said for the Schmitt trigger circuits 10, 20, since they are devices now well known to the man skilled in the art.

Referring to the waveform diagrams of FIG. 2, signal A represents specific intelligence as a "tone burst" of a selected audio frequency, say 2,550 cycles per second, for a time duration of $Tx$ to $Ty$ seconds. When such a signal is applied between input terminals 12, 14, the circuitry shown in FIG. 1 will provide a distinctive signal on output terminals 24, 26, for the same time duration $Tx$ to $Ty$, such distinctive signal being a change in voltage level from one selected voltage level representing the absence of tone burst A to another selected voltage level representing the existence of tone burst A.

In FIG. 1, the incoming intermittent signal A is applied to Schmitt trigger circuit 10 by leads 36 and 38 connected to input terminals 12, and 14 respectively, lead 38 being grounded. The output side of Schmitt trigger 10 is connected to one input terminal 40 of the double input phase detector 30 and to one input 42 of double input data detector 18 by a lead 44. The output of phase detector 30 appears on lead 46, the latter being connected to one side of resistor 48 of the filter 32. The filter 32 includes another resistor 50 and a capacitor 52 connected in series from the other side of resistor 48 to ground. The output of the filter 32 appears on a lead 54 connected to the junction of resistors 48 and 50, the lead 54 being connected to the frequency controlling elements in the input side of the voltage controlled oscillator 34. The output of voltage controlled oscillator 34 appearing on a lead 56 is fed back to a second input 57 of phase detector 30 to close and complete the phase lock loop 16.

Referring to FIG. 2, signal A comprises no or zero signal for the intervals T*w* to T*x*, a sinusoidal signal for the period T*x* to T*y* of frequency *f* and a no or zero signal portion T*y* to T*z*. Output signal B on lead 44 is a square wave of the same frequency as and in phase with signal A, signal B varying between potential levels of zero and —V. The other input to phase detector 30 on terminal 57 is the output signal C from the voltage controlled oscillator 34. Voltage wave C in the time interval T*x* to T*y* has the same frequency and amplitude as voltage wave B but with a phase difference of 90° related to signal B. Voltage controlled oscillator 34 has a continuous output with its frequency controlled by filtered signal E on input lead 54. Accordingly, the C signal wave form does not terminate at time T*y* as does signal B but is maintained continuous under the control of the averaging D.C. E signal. As is known from the theory disclosed in the above referenced prior art article, the output signal C of voltage control oscillator 34 will have the same frequency as the input signal B on lead 44 when the closed phase loop 30, 46, 32, 54, 34, 56, 30 is "locked." When the phase loop 16 is "locked," the output signal D of phase detector 30 on lead 46 has twice the frequency as signal B. Filter 32 averages signal D as a D.C. voltage signal E which varies from a mean value depending on the difference of the frequency between frequency of signal B and frequency of signal C in the time interval T*x* to T*y*. If the output frequency signal C of the voltage control oscillator 34 is not the same as the frequency of incoming signal B, the phase loop is "unlocked" and the signal on lead 46 may be D'. The resulting average filtered signal E' as shown in FIG. 2 is greater than filtered signal E (when the phase loop is "locked") and the increased input D.C. signal from E to E' to the voltage control oscillator 34 changes its output frequency so that signal C is urged to have the same frequency as signal B for "locking" the phase loop. Rapidly, signal D' becomes D and signal E' becomes signal E.

The net effect of sub-system 16 including the voltage controlled oscillator is that of a band pass filter. All filter shaping, however, is effected by the filter network 32. Since the output of the phase detector 30 on lead 46 is the algebraic difference between the input signal and the natural frequency of the voltage controlled oscillator 34, frequency outside of the desired band pass is rejected by the simple low pass filter 32. Resistor 50 is used to allow a small portion of the band pass signal to pass into the voltage controlled oscillator 34. This causes a "speed-up" effect and tends to increase the loop response time, which in turn reduces the time required for the voltage controlled oscillator to "lock" to the input signal.

The shape of the characteristic low pass filter 32 starts at maximum signal at zero frequency and rolls off approximately at 6 db per octave. As it approaches maximum attenuation it will level off due to the divider action between resistors 48 and 50. In actual operation, however, as seen by the input signal, the voltage controlled oscillator frequency is displaced very slightly to provide a minimum control voltage to stabilize the voltage controlled oscillator 34. The input signal frequency may go up or down in frequency, thus a mirror image is added to the pass band having the same shape as the low pass filter characteristic. Therefore, the band width of the system is a frequency displacement equal to twice that of the natural frequency of the low pass filter 32.

According to the invention, 90° phase shifter 19, such as model 75012 manufactured by James Millen, Malden, Mass., is connected at its input side to the output lead 56 of the voltage control oscillator 34. A lead 58 is connected between the output side of phase shifter 19 and the other input terminal 59 of data generator 18. Within data generator 18, one side of each of a pair of resistors 60, 62 is connected to a base electrode 64 of a transistor 66 by a common lead 68. The other sides of resistors 60, 62 are connected to input terminals 59, 42 by leads 70, 72, respectively. A cathode side of each of a pair of diodes 74, 76 is connected to an emitter electrode 78 of transistor 66 by a common lead 80. An anode side of each of the diodes 74, 76 is connected to leads 70, 72 respectively. A collector electrode 82 is connected to a —V potential through a resistor 84 by a lead 85. An output terminal 86 of data generator 18 is connected to the collector electrode 82 by a lead 88. The output of data generator 18 is connected to an input side of filter 22 by a lead 90 connected between one side of a resistor 92 of filter 22 and output terminal 86 of data generator 18. The other side of resistor 92 is connected through a capacitor 94 to ground and to the input of Schmitt trigger circuit 20 by a lead 96. The output of Schmitt trigger circuit 20 is connected to tone burst analyzer output terminals 24, 26 by leads 98 and 99, respectively, terminal 26 and lead 99 being grounded.

According to the invention, output signal F of phase shifter 19 is at the same frequency as signal C but shifted 90° therefrom so that signal F in the time interval T*x* to T*y* is in phase with signals A and B. Signal F, like signal C, but unlike signals A and B, are continuous and operate during the time interval T*y* to T*z* when signals A and B intermittently disappear. Since signals C and F are continuous, it will be assumed that they are present during and before the interval T*w* to T*x* on FIG. 2 as initiated by a prior tone burst similar to signal A.

Referring to FIG. 2, in time interval *t*1 to *t*2 signals B and F are both at zero potential. Accordingly, the base electrode 64 of transistor 66 is established at a zero potential by conductance paths through resistors 60 and 62 while the emitter electrode 78 is clamped at a zero potential by a low impedance path through diodes 74 and 76. Accordingly, transistor 66 is rendered non-conducting by a zero potential difference between its base 64 and emitter 78, and output terminal 86 assumes the —V potential of the lead 85 since no current flows through resistor 84. During such time interval, the signal G on output terminal 86 of data generator 18, is at the level of —V volts. During the next time interval *t*2 to *t*3, signal B is still at zero potential while the F signal is at —V potential. Accordingly, the base electrode 64 of transistor 66 assumes a —V potential through conductance path 70 and resistor 60 while the emitter electrode 78 is clamped to ground potential through diode 76 and lead 72 connected to the output lead 44 of Schmitt trigger circuit 10. Accordingly, transistor 66 is triggered to a saturation (conduction) condition to establish output terminal 86 at the same potential as emitter 78, namely zero. During the time interval *t*3 to *t*4, the potential on all electrodes including the collector 82 and output terminal 86 are identical to the corresponding potentials during the time interval *t*1 to *t*2. Specifically the signal G during such interval is at —V potential.

During time interval $t4$ to $t5$ Schmitt trigger 10 changes its output level in response to the incoming signal A and the output B on lead 44 changes from zero to —V potential. During the same interval, the F signal is also at —V potential. Accordingly, the base electrode 64 is forced to a —V potential by conduction paths through resistors 60 and 62 while emitter electrode 78 is maintained at the —V potential. Such equal voltages on the emitter 78 and base 64 renders transistors 66 non-conductive and signal G assumes the —V potential of lead 85. During the next time interval $t5$ to $t6$, both signals B and F are at zero potential. Accordingly, the base electrode 64 is forced to a zero potential by conduction paths through resistors 60 and 62 while emitter electrode 78 is clamped at a zero potential by low impedance paths through diodes 74 and 76. Such equal voltages on the emitter 78 and base 64 renders transistor 66 non-conductive and signal G remains at the —V potential of lead 85.

Signals B and F both vary between —V and zero in the time interval $t6$ to T$y$. However, signals B and F are identical in phase and frequency during this interval (as well as in interval T$x$ to T$y$) and the base 64 and emitter 78 vary in unison (without voltage difference therebetween) between —V and zero. Accordingly, signal G remains at a potential of —V. By continuing such analysis, we find that, in the interval T$y$ to T$z$, G varies periodically between zero and —V as shown in FIG. 2.

Filter 22 averages the signal G and accordingly its output signal H is at $-V/2$ during the time interval $t1$ to $t3$. At time $t3$, the H signal decays to the level of the G signal or —V potential. At time T$y$, the H signal rises to the average value of G or $-V/2$ potential. The shape of the falling and rising portions of the H curve at the beginning and end of the time interval T$x$ to T$y$ is determined, inter alia, by the time constant characteristics of filter 22.

Signal H on the output lead 96 of filter 22 controls the Schmitt trigger 20 to provide signal J on leads 24, 26. The change in voltage between levels zero and —V during the time interval T$x$ to T$y$ represents the decoded intelligence in the frequency $f$ of the tone burst signal A.

At the start of the next tone burst A, the signal B might be at potential —V instead of zero potential during the interval T$w$ to T$x$. Accordingly, the G signal will then have the same shape as it has in FIG. 2 but its phase will be shifted 180°. However, signal J will still be representative of the frequency of the tone burst in the tone burst interval.

It is understood that the circuits shown in FIG. 1 may be adjusted so as not to limit the tone frequency, burst rate, or signal level. Audio amplifiers, radio frequency amplifiers, and special filters may be employed at the input. Also, a current amplifier may be inserted between the data generator 18 and the filter 22. Since the output of Schmitt trigger 20 consists of single line, serial, binary levels, logic that is compatible with the output may be used for decoding or combining the outputs of tone analyzers.

The tone burst analyzer according to FIG. 1 detects the presence of binary information encoded in the form of precise frequency tone bursts each similar to signal A. Such circuitry allows detection of a tone burst in the presence of large amounts of noise and other binary tones at near adjacent frequencies as controlled by selective adjustment of filter 32 for a desired bandpass characteristic.

The rejection capability of the tone burst analyzer of frequencies outside of the band to which it is tuned by its bandpass filter, permits its use in pairs or groups. Accordingly, data may be frequency multiplexed on closely spaced bands to allow maximum binary data transmission with minimum band width.

Both theormetical calculations and experimental results of the tone burst decoder according to FIG. 1 have shown the detector to exhibit a 2:1 improvement in detection capabilities over all other methods such as passive filters employing capacitors and inductors or crystals, band limited frequency discrimination and phase shift detection. This means that for the same error rate on the output, the incoming signal may be 3 decibels lower in amplitude when compared to the noise level than the signal level required for the above mentioned systems.

Figures 3, 4, 5:
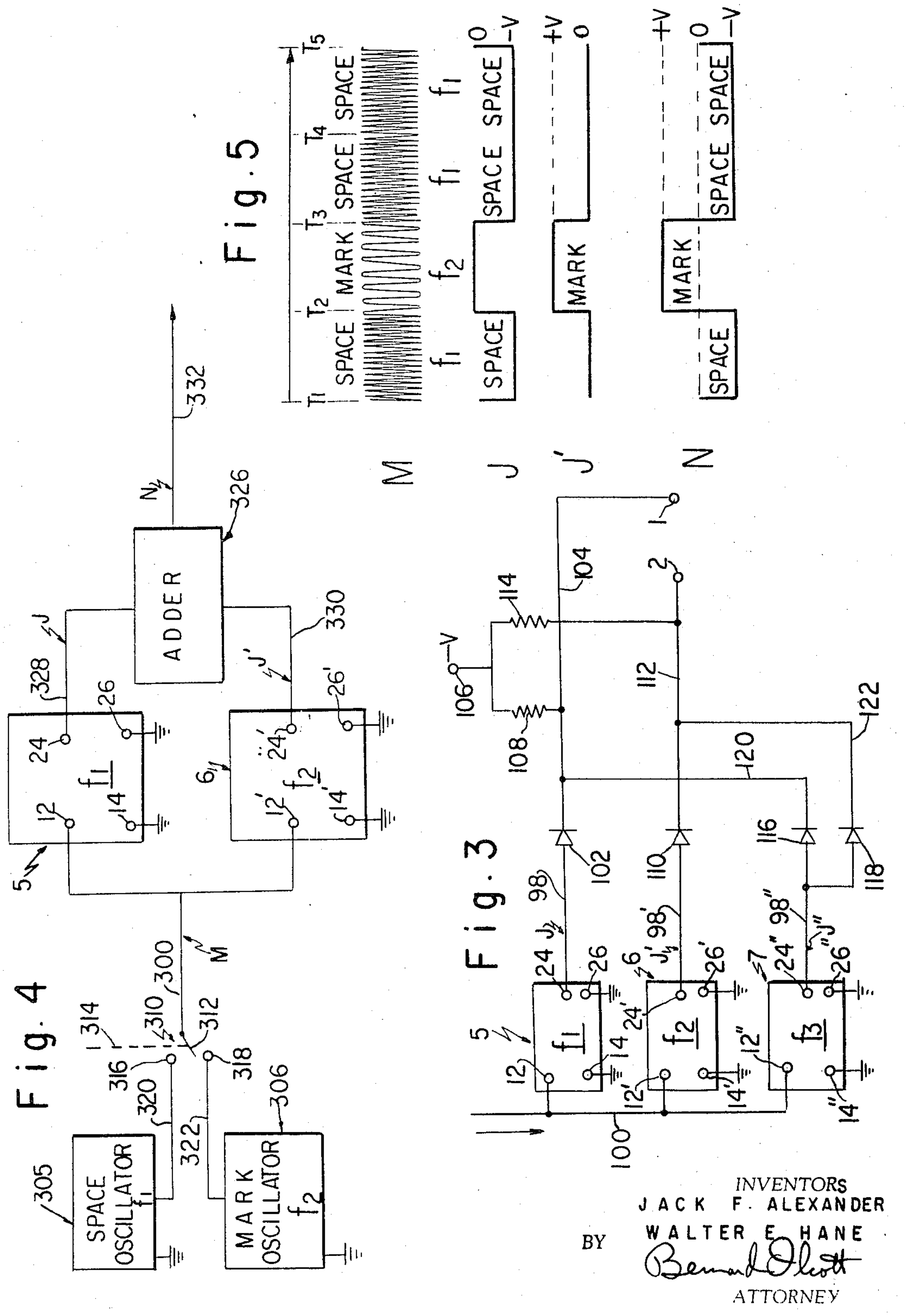
FIGURE 3 is a schematic diagram of an embodiment of the invention of FIGURE 1 which represents either a tone burst telemetry receiving system employing a plurality of closely spaced frequency subchannels, or a frequency spectrum analyzer.
FIGURE 4 is a schematic diagram of another embodiment of the invention of FIGURE 1 as employed in an improved teletype system of the key shifting type.
FIGURE 5 illustrates the waveform of the signals in selected portions of FIGURE 4.

FIGS. 3 and 4 illustrate embodiments of the invention employing groups of tone burst analyzers, each similar to the one shown in FIG. 1 and each tuned to a separate discrete frequency.

In FIG. 3, a ground station of a tone burst telemetry system is shown as comprising three tone burst analyzers 5, 6 and 7. Tone burst analyzers 6 and 7 are similar to tone burst analyzer 5 of FIG. 1 (which is tuned to frequency $f1$) except that the voltage controlled oscillators in their phase lock loops corresponding to 34 in FIG. 1 are tuned to separate distinctive frequencies $f2$ and $f3$. All three tone burst analyzers 5, 6 and 7 are connected by their input terminals 12, 12′ and 12″, respectively, to a common incoming signal line 100. The other input terminals 14, 14′ and 14″ are grounded. While only three tone burst analyzers are shown in FIG. 3, 128 of such tone burst analyzers provide a particularly useful telemetry ground station system for receiving information from a satellite in flight or orbit.

In FIG. 3, the output lead 98 of tone burst decoder 5 is connected to the anode of diode 102. A coded output terminal 1 is connected to the cathode of diode 102 by a lead 104. Lead 104 is connected through a resistor 108 to a terminal 106 having a negative reference voltage —V applied thereto. An output lead 98′ connects the output terminal 24′ of tone burst analyzer 6 to the anode of a diode 110. Another coded output terminal 2 is connected to the cathode of diode 110 by a lead 112, lead 112 being connected to the negative voltage reference terminal 106 through a resistor 114. Tone burst analyzer 7 has its output terminal 24″ connected to the anodes of each of two diodes 116, 118 by a lead 98″. The cathode of diodes 116 is connected to lead 104 by a lead 120 while the cathode of diode 118 is connected to lead 112 by a lead 122. The other analyzer output terminals 26′ and 26″ are connected to ground in the manner that analyzer output terminal 26 is grounded.

Assuming that no tone bursts appear on incoming line 100, signals J, J′, J″, on leads 98, 98′ and 98″ remain at zero potential, Accordingly, diodes 102, 110, 116, and 118 are polarized in low impedance states to impose zero potential on the coded output terminals 1 and 2. When common incoming line 100 receives a tone burst of frequency $f1$, signal J on lead 98 is changed to —V volts as shown in FIG. 2. Diode 102 is reversed polarized to a blocking condition so that output coded terminal 1 assumes negative reference voltage —V from terminal 106 by a conductance path through resistor 108 and lead 104. Coded output terminal 2 remains at zero potential as determined by signals J′ and J″ at zero potential. When incoming line 100 receives a tone burst of frequency $f2$, signal J′ on lead 98′ assumes a —V potential, diode 110 is blocked and coded output terminal 2 assumes the negative reference —V voltage on terminal 106 through resistor 114 and lead 112. Coded output terminal 1 remains at zero potential. When incoming line 100 receives a tone burst of frequency $f3$, signal J″ on lead 98″ reverse polarizes diodes 116 and 118 to its blocked condition so that output coded terminals 1 and 2 both change their potential from zero to the negative reference voltage —V on terminal 106 by conductance paths through the resistors 108 and 114 and leads 104 and 112.

It can be seen that the potentials on coded output terminals 1 and 2 are indicative, according to the binary code, of which of the tone burst analyzers 5, 6 and 7 is responding to tone burst input signals on the common incoming line 100. That is to say, $f1$ is represented by 01 on terminals 2, 1, $f2$ is represented by 10 and $f3$ is represented by 11. By using three output coded terminals, any one of seven energized tone burst frequencies can be identified. In order to accommodate 128 tone burst analyzers, it is necessary to have seven. coded output terminals. The circuits of interconnected diodes to be employed at the outputs of the analyzers for identifying input frequencies in the binary code system are known to the man skilled in the art. FIG. 3 merely represents one known arrangement when only three tone burst analyzers are to be accommodated.

It is to be understood, that when groups of tone burst analyzers are connected to a common input channel, all of the tone burst analyzers can have a common Schmitt trigger 10 which preshapes the tone burst signal and eliminates some of the undesirable noise (including adjacent channel data).

While FIG. 3 has been described as a telemetry system employing the invention, the same circuitry of the FIG. 3 can also represent another embodiment of the invention, namely, a frequency spectrum analyzer. In such a frequency spectrum analyzer a complex signal to be analyzed is placed upon the single incoming signal line 100 and is fed in the input terminals 12, 12′, 12″ . . . *n* of a plurality of tone burst analyzers 5, 6, 7 . . . *n*. Each of the tone burst analyzers is tuned to a separate discrete frequency by selective adjustment of its frequency by-pass filters. Accordingly, the components of the complex wave applied to line 100 will energize the output terminals of specific tone burst analyzers according to the discrete frequencies contained within the composite or complex wave and the tuning of specific tone burst analyzers. Such specific energized tone burst analyzers will be identified by the signals appearing in binary code on output terminals 1, 2 . . . *n′* according to how many bits are required to represent the number of tone burst analyzers employed in the system.

FIG. 4 illustrates a teletype system embodiment of the invention employing frequency shift keying at the sending station and two tone burst analyzers 5, 6 at the receiving station for a single channel of communication on line 300 therebetween. For the single channel teletype system shown in FIG. 4, a frequency *f*1 is chosen for the SPACE signals and another closely adjacent frequency *f*2 is chosen for the MARK signals. Oscillators 305, 306 and tone burst analyzers 5, 6 are tuned to the frequencies *f*1 and *f*2, respectively. A keying device 310 at the sending station has an armature 312 selectively moved by mechanical linkage 314 according to some code by any known means (not shown) between stationary contacts 316 and 318, armature 312 being connected to line 300. Contact 316 is connected to the output of oscillator 305 by a lead or cable 320 while contact 318 is connected to the output of oscillator 306 by cable or lead 322.

FIG. 5 illustrates the signal M appearing on line 300 for the signal sequence SPACE, MARK, SPACE, SPACE. As shown, the SPACE signal is represented by frequency *f*1 and the MARK signal is shown by the frequency *f*2. The frequencies *f*1 and *f*2 are shown in FIG. 5 as being greatly different one from the other for illustrative purposes only and it is to be understood that the two frequencies are usually very close to each other.

At the receiving station, the single channel line 300 is connected to terminals 12 and 12′ of tone burst analyzers 5 and 6 respectively. Terminals 14 and 14′ are grounded as is one output side of each of the oscillators 305, 306 to complete the electrical loop.

The output appearing on terminal 24, corresponds to signal J of FIG. 2 which changes level from zero to —V whenever tone analyzer 5 receives a "tone burst" of *f*1. The Schmitt trigger in the output of tone burst analyzer 6 (which corresponds to 20 in FIG. 1) provides an output J′ which varies from zero to —V whenever tone burst analyzer 6 receives a "tone burst" of *f*2. Accordingly in FIG. 5, signals J and J′ appear on terminals 24 and 24′ in response to the input signal M on line 300. The terminals 24, 24′ are each connected to one input of an adder circuit 326 by leads 328 and 330 respectively. Signal N in FIG. 5 illustrates the waveform on the output channel 332 of adder 326. Such output duplicates the input signal applied to the keying device 310 at the receiving station with improved signal-to-noise ratio as compared with other known teletype system methods.

It is to be understood that many more than one communication channel can be transmitted over single line 300 by duplicating equipment at the receiving station and sending station. All the movable armatures 312, 312′, 312 . . . *n*, would then be connected to the single line 300 and all the tone burst analyzers 5, 6, 7, 8 . . . *n*, would be connected to the receiving station side of single line 300. Adjacent communication channels would have separate discrete pairs of frequencies for the SPACE and MARK signals. The band-pass filter in each of the tone burst analyzers 5, 6 . . . *n* would be selectively adjusted to receive but one discrete separate frequency.

Figure 6:
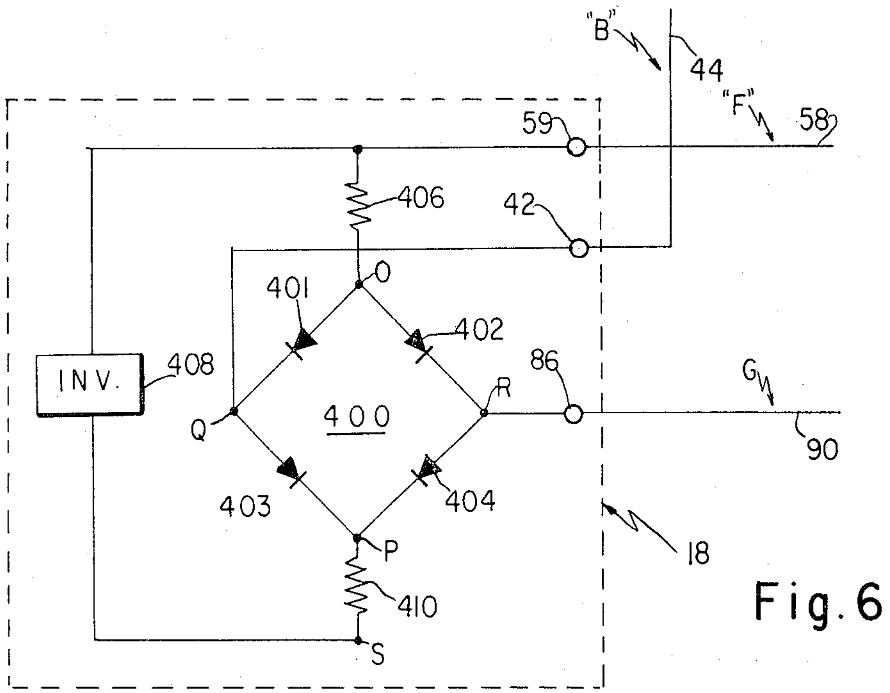
FIGURES 6 and 7 illustrate other embodiments according to the invention, of a component shown in FIGURE 1 as data generator 18.

Another embodiment of the invention for data generator 18 in FIG. 1 is shown in FIG. 6 and comprises a bridge arrangement 400 having four diodes 401, 402, 403 and 404. As illustrated, anode electrodes of diodes 401 and 402 are connected to bridge junction point O, cathode electrodes of diodes 403 and 404 are connected to an opposite bridge junction point P, cathode electrode of diode 401 and anode electrode of diode 403 is connected to another bridge junction point Q while cathode electrode of diode 402 and anode electrode of diode 404 is connected to the remaining bridge junction point R. Bridge junction point O is connected through a resistor 406 to terminal 59, the latter also being connected to bridge point P through a voltage inverter 408 and a resistor 410. Bridge junction points Q and R are connected to terminals 42 and 86, respectively.

Referring to FIG. 2, when signals F and B as applied to terminals 59 and 42 are simultaneously zero, the potential of bridge junction point Q is zero, a voltage drop of —V appears across resistors 406 and 410, the potentials of bridge junction points O and P are —V and zero, respectively, diodes 401 and 404 are biased to their "blocking condition" and the signal G appearing on bridge junction point R is —V. When signals F and B are simultaneously —V, the voltage drops across resistors 406 and 410 are zero and the potential of bridge junction points O and P are —V and zero, respectively, while diodes 403 and 404 are biased to their "blocking condition" to provide a signal G on bridge junction point R equal to —V. When signals F and B are —V and zero, respectively, no voltage drop appears across resistors 406 and 410 to establish a potential of —V and zero for bridge junction points O and P, respectively while diodes 401 and 402 are biased to their "blocking condition" to provide a signal G equal to zero by the clamping action of diode 404. When signals F and B are O and —V, respectively, a voltage drop of —V appears across resistors 406 and 410, the potentials of bridge junction points O and P are —V and zero, respectively, and diodes 402 and 403 are biased to their "blocking condition" to provide a signal G equal to zero by the clamping action of diode 404.

Figure 7:
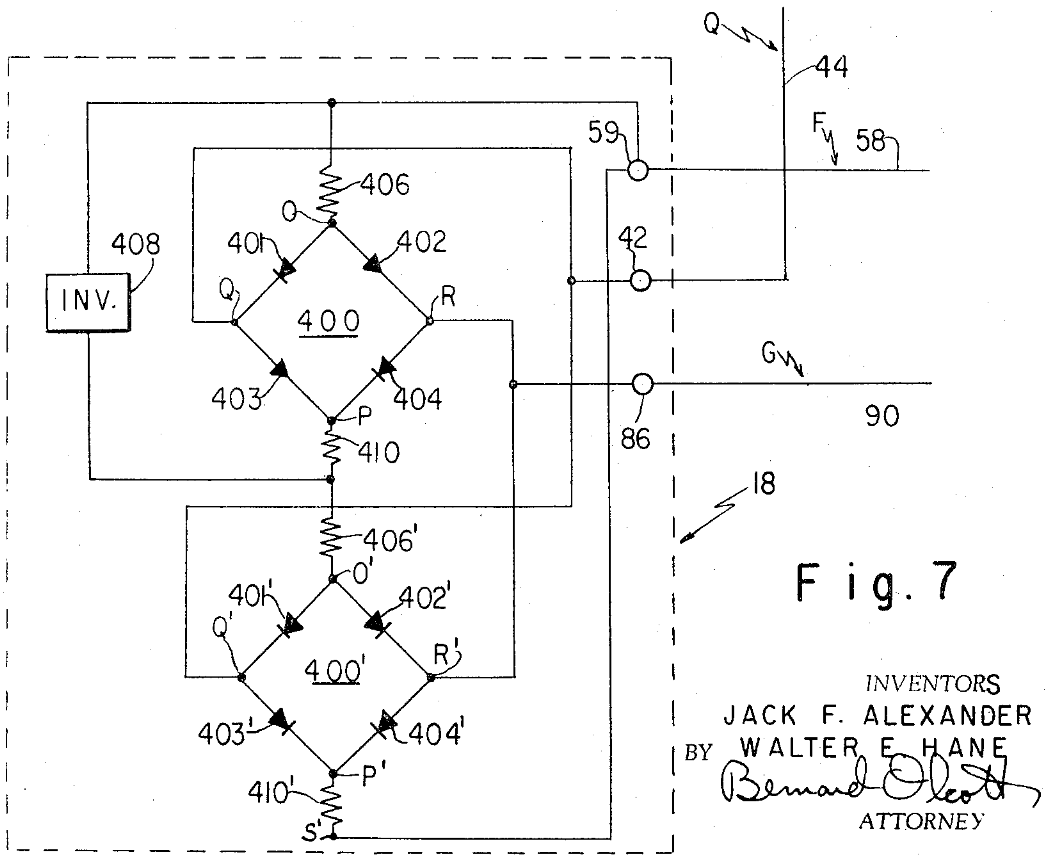

FIG. 7 employs another bridge circuit 400′ with components 401′, 402′, 403′, 404′, 406′ and 410′ connected to terminals 42 and 86 in similar fashion to components 401, 402, 403, 400, 406 and 410 of FIG. 6. However, terminal, 59 is connected to the end of resistor 410′ opposite bridge junction point P′ while the end of resistor 406′ opposite bridge junction point O′ is connected to the output side of voltage inverter 408. Accordingly, the signals G in FIG. 7 are double pulses for providing twice the gain of FIG. 6.

While there has been described and pointed out the fundamental novel features of the invention as applied to preferred embodiments, it will be understood that various omissions and substitutions and changes in the form and details of the devices illustrated and its operation may be made by those skilled in the art, without departing from the spirit of the invention. It is the invention, therefore, to be limited only as indicated by the scope of the following claims.

What we claim is:

1. A tone burst analyzer which comprises a phase lock loop adapted to receive a tone burst signal having a selected frequency for a selected time interval and including an oscillator; a phase shifter coupled at its input side to said oscillator at its output side; and a data generator coupled at its input side to both the input side of said phase lock loop and to the output side of said phase shifter for yielding one signal during the time periods when the instantaneous signal inputs to the data generator are similar and another signal when the instanteous signal inputs to the data generator are dissimilar; said data generator including a transistor; a pair of connected diodes the common side of each being connected to a common input-output electrode of said transistor, the other side of said diodes being connected respectively to one of the inputs to said data generator; a pair of resistors one end of each being connected to the other input electrode of said transistor, the other ends of said resistors being connected respectively to one of the inputs to said data generator; and an output resistor one end of which is connected to the other output electrode of said transisor and the other end of which is adapted to be connected to a source of constant potential.

2. A tone burst analyzer according to claim 1 including a double output Schmitt trigger circuit means connected at its output side to the input side of said phase lock loop, the input side of said Schmitt trigger circuit means being adapted to receive said one burst signal and wherein said phase shifter is a 90° phase shifter.

3. A tone burst analyzer which comprises a phase lock loop adapted to receive a tone burst signal having a selected frequency for a selected time interval and including an oscillator; 90° phase shifter coupled at its input side to said oscillator at its output side; a data generator coupled at its input side to both the input side of said phase lock loop and to the output side of said phase shifter for yielding one signal during the time periods when the instantaneous signal inputs to the data generator are similar and another signal when the instantaneous signal inputs to the data generator are dissimilar; and a double output Schmitt trigger circuit means connected at its output side to the input side of said phase lock loop, the input side of said Schmitt trigger circuit means being adapted to receive said tone burst signal; said data generator including a transistor; a pair of connected diodes the common side of each being connected to a common input-output electrode of said transistor, the other side of said diodes being connected respectively to one of the inputs to said data generator; a pair of resistors one end of each being connected to the other input electrode of said transistor, the other ends of said resistors being connected respectively to one of the inputs to said data generator; an output resistor one end of which is connected to the other output electrode of said transistor and the other end of which is adapted to be connected to a source of constant potential; a filter connected at its input side to said other output electrode; and another double output Schmitt trigger circuit means connected at its input side to the output side of said filter, one output of said another Schmitt trigger circuit means representing the presence of said tone burst signal at the input side of said phase lock loop.

4. A tone burst telemetry receiving station which comprises a common incoming signal line adapted to receive a plurality of tone burst signals each having a selected frequency, a plurality of tone burst analyzers each coupled at its input side to said common incoming signal line and each comprising a phase lock loop adapted to receive a tone burst signal having a selected frequency for a selected time interval and including: an oscillator; a phase shifter coupled at its input side to said oscillator at its output side; and a data generator coupled at its input side to both the input side of said phase lock loop and to the output side of said phase shifter for yielding one signal during the time periods when the instantaneous signal inputs to the data generator are similar and another signal when the instantaneous signal inputs to the data generator are dissimilar; said data generator including: a transistor; a pair of connected diodes the common side of each being connected to a common input-output electrode of said transistor, the other side of said diodes being connected respectively to one of the inputs to said data generator; a pair of resistors one end of each being connected to the other input electrode of said transistor, the other ends of said resistors being connected respectively to one of the inputs to said data generator; an output resistor one end of which is connected to the other output electrode of said transistor and the other end of which is adapted to be connected to a source of constant potential; a filter connected at its input side to said other output electrode; and a Schmitt trigger circuit connected at its input side to the output side of said filter; an output signal appearing at the output side of one of said Schmitt trigger circuits being indicative of the presence of a particular one of the tone burst signals on said common incoming signal line.

5. A tone burst telemetry receiving station according to claim 4 wherein in each of said data generators, said common input-output electrodes is an emitter connected to the anode sides of said pairs of diodes while the other input electrode is a base electrode connected to one side of each of said resistors, said source of potential being a negative source of potential coupled to the collector electrode through said output resistor.

References Cited

UNITED STATES PATENTS

| | | | |
|---|---|---|---|
| 3,109,143 | 10/1963 | Gluth | 325—320 |
| 3,111,625 | 11/1963 | Crafts | 329—128 X |
| 3,181,122 | 4/1965 | Brown | 325—30 X |
| 3,204,185 | 8/1965 | Robinson | 325—346 X |
| 3,222,454 | 12/1965 | Losee | 178—88 |

ROBERT L. GRIFFIN, *Primary Examiner.*

W. S. FROMMER, *Assistant Examiner.*

U.S. Cl. X.R.

178—88, 66; 325—30, 346; 329—122, 128; 328—134